US007962003B2

(12) United States Patent
Tomita

(10) Patent No.: US 7,962,003 B2
(45) Date of Patent: Jun. 14, 2011

(54) VIDEO-AUDIO REPRODUCING APPARATUS, AND VIDEO-AUDIO REPRODUCING METHOD

(75) Inventor: Go Tomita, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 229 days.

(21) Appl. No.: 12/426,826

(22) Filed: Apr. 20, 2009

(65) Prior Publication Data

US 2010/0054708 A1 Mar. 4, 2010

(30) Foreign Application Priority Data

Aug. 29, 2008 (JP) ................................ 2008-222631

(51) Int. Cl.
*H04N 9/80* (2006.01)
*H04N 5/92* (2006.01)
*H04N 5/928* (2006.01)
(52) U.S. Cl. ........ 386/239; 386/337; 386/338; 386/339; 386/340
(58) Field of Classification Search .................... 386/95, 386/96, 239, 248, 278, 285, 337–340
See application file for complete search history.

(56) References Cited

U.S. PATENT DOCUMENTS

| 6,212,959 B1* | 4/2001 | Perkins ...................... 73/861.77 |
| 2007/0172195 A1* | 7/2007 | Hattori et al. ................... 386/54 |
| 2009/0279867 A1* | 11/2009 | Hamada et al. ................ 386/96 |

FOREIGN PATENT DOCUMENTS

| JP | 55-035582 | 3/1980 |
| JP | 62-136980 | 6/1987 |
| JP | UM 64-007469 | 1/1989 |
| JP | 2-073787 | 3/1990 |
| JP | 2-103977 | 8/1990 |
| JP | 05-037874 | 2/1993 |
| JP | 05-236389 | 9/1993 |
| JP | 7-107406 | 4/1995 |
| JP | 07-303223 | 11/1995 |
| JP | 2006-164328 | 6/2006 |
| JP | 2007-019651 | 1/2007 |
| WO | 2004/066303 | 8/2004 |

OTHER PUBLICATIONS

English Translation of Notification for Reasons for Refusal dated Sep. 1, 2009, for application No. JP 2008-222631.

* cited by examiner

*Primary Examiner* — Thai Tran
*Assistant Examiner* — Hung Q Dang
(74) *Attorney, Agent, or Firm* — Blakely, Sokoloff, Taylor & Zafman LLP

(57) ABSTRACT

According to an aspect of the present invention, there is provided a video-audio reproducing apparatus including: an audio processing unit configured to apply a sound field effect to an audio of a content, the audio having an audio mode; an audio mode detecting unit configured to detect the audio mode of the audio; and a switching unit in configured to invalidate the sound field effect applied by the audio processing unit when the audio mode is a dual-mono broadcasting mode in which the audio includes a main audio and a sub audio.

9 Claims, 3 Drawing Sheets

VIDEO-AUDIO REPRODUCING APPARATUS, AND VIDEO-AUDIO REPRODUCING METHOD

CROSS-REFERENCE TO RELATED APPLICATIONS

This application is based upon and claims the benefit of priority from Japanese Patent Application No. 2008-222631, filed on Aug. 29, 2008, the entire contents of which are incorporated herein by reference.

BACKGROUND

1. Field

An aspect of the present invention relates to a video-audio reproducing apparatus and a video-audio reproducing method for reproducing movies and audios supplied thereto.

2. Description of the Related Art

For example, in a television receiving apparatus as a video-audio reproducing apparatus for reproducing video data (movie) and audio data (sound), movies and audios that are reproduction targets have various standards or modes. In the contents such as movies and music (audio file) with movie files or television programs provided through a space wave or an optical fiber, through various recording mediums, or through a network, an effect file (audio file for effect) may be accompanied with an audio file to improve sound-field sensitivity and to realize various surround effects (hereinafter, referred to as surround).

However, nowadays, there are many cases that a television receiving apparatus is connected to an AV device (audio amp), an external speaker, or a mobile device (mobile video-audio recording-reproducing device) through an HDMI (High Definition Multimedia Interface). In addition, there is a case that the television receiving apparatus is connected to a home server (mass recording device), a PC (personal computer), or the like through a closed network, for example, an in-home LAN (Local Area Network).

In JP-S62-136980-A, a television receiver is described, which includes an audio multiplex demodulating circuit and a special sound effect adding circuit (surround effect switching circuit), and automatically switches a special sound effect (ON-OFF controls surround effect) in accordance with each mode of a main audio mode, a sub audio mode, a main/sub audio mode, a monaural audio mode, and a stereo audio mode, by an audio multiplex mode switching signal, with respect to an output signal of the audio multiplex demodulating circuit.

However, JP-S62-136980-A discloses only the automatic switching ON/OFF of the surround effect, and does not consider reproduction of audio data in a PC or the like for reproducing IP broadcasting based on an internet protocol or a dual-mono audio (different monaural audios are provided as much as 2 channels or more) mode used for the present television broadcasting.

BRIEF DESCRIPTION OF THE SEVERAL VIEWS OF THE DRAWINGS

A general architecture that implements the various feature of the present invention will now be described with reference to the drawings. The drawings and the associated descriptions are provided to illustrate embodiments of the present invention and not to limit the scope of the present invention.

DETAILED DESCRIPTION

Various embodiments according to the present invention will be described hereinafter with reference to the accompanying drawings. In general, according to one embodiment of the present invention, there is provided a video-audio reproducing apparatus including: an audio processing unit configured to apply a sound field effect to an audio of a content, the audio having an audio mode; an audio mode detecting unit configured to detect the audio mode of the audio; and a switching unit in configured to invalidate the sound field effect applied by the audio processing unit when the audio mode is a dual-mono broadcasting mode in which the audio includes a main audio and a sub audio.

Hereinafter, an example of an embodiment of the invention will be described with reference to the drawings.

Figure 1:
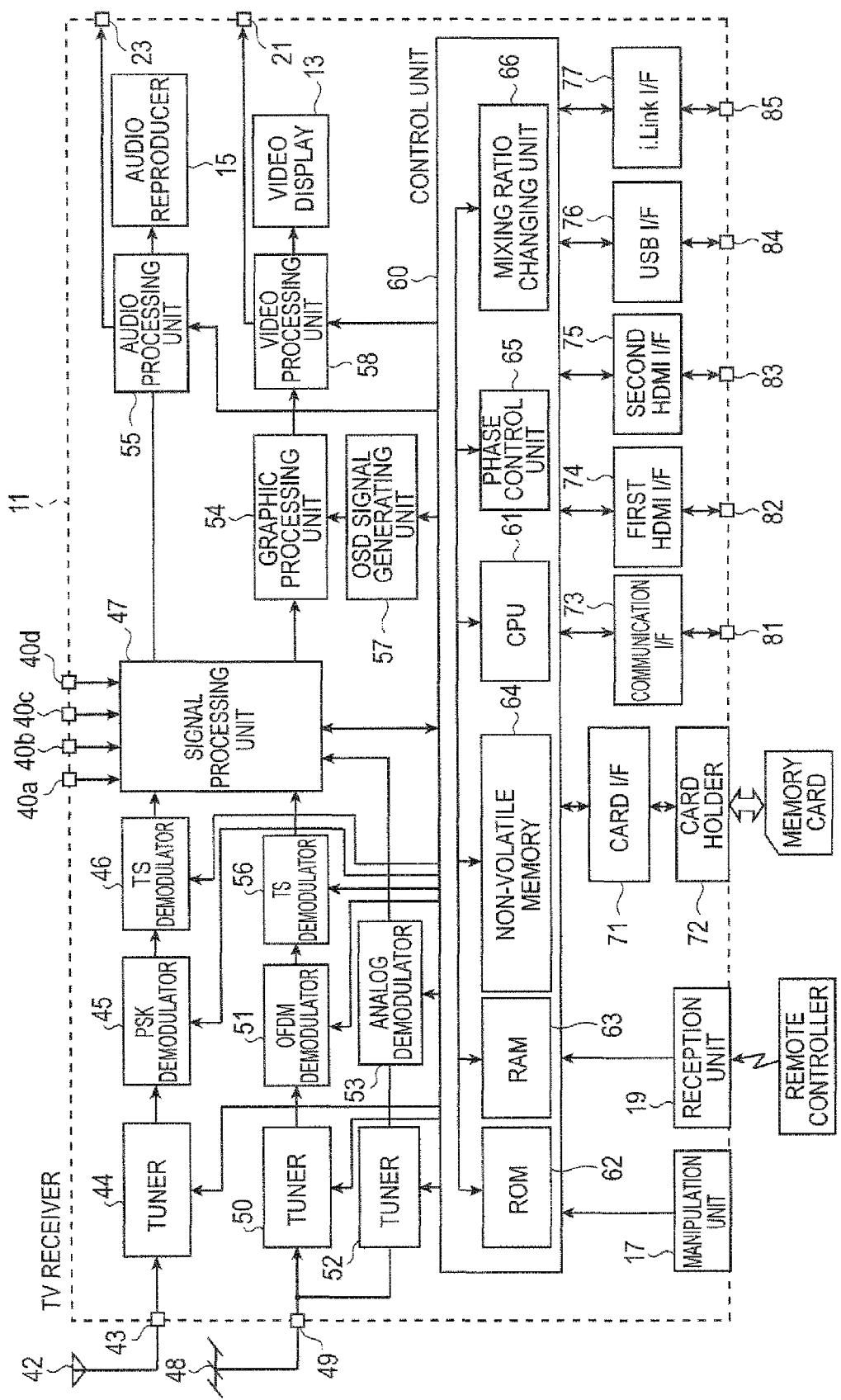
FIG. 1 is an exemplary schematic diagram illustrating a video-audio reproducing apparatus according to an embodiment of the invention.

FIG. 1 exemplary shows a video-audio reproducing apparatus according to an embodiment of the invention. In the following description, the video-audio reproducing apparatus may be, for example, a television receiver (hereinafter, referred to as a TV receiver) provided integrally with an video display device (monitor device) and a video-audio recording-reproducing apparatus (recorder device) capable of recording an input video (movie) and audio (audio data) and capable of outputting the video and audio at the time of reproducing.

FIG. 1 is an exemplary schematic block diagram illustrating a video-audio reproducing apparatus (TV receiver) according to the embodiment.

The TV receiver 11 includes a video display 13, such as a liquid crystal display panel or the like, displaying a video corresponding to a video signal (video data), an audio reproducer 15, such as a speaker, reproducing audio output (audio data), a manipulation unit 17 receiving an instruction information (control input) signal from a user, a remote controller receiving unit 19 receiving an instruction information (control input) signal by a remote controller from the user, a control block (control unit) 60 and the like.

In the TV receiver 11, an operation of each unit, display and audio (sound) output are generally controlled by the control unit (control block, which may be called as a main board) 60.

The control unit 60 has a main control IC (LSI) such as a CPU (Central Processing Unit) 61 therein. The control unit 60 controls each unit based on the instruction information from the remote controller through the reception unit 19 or from the manipulation unit 17.

The control unit 60 includes a ROM (Read Only Memory) 62 storing control programs to be executed by the CPU 61, a RAM (Random Access Memory) 63 providing a work area for the CPU 61 and a non-volatile memory (NVM) 64 storing and keeping various setting information, control information, and the like. The non-volatile memory (NVM) 64 serves as "a surround setting keeping unit" for keeping a user setting for applying a surround effect on the broadcasting (audio source). That is, an audio reproducing mode for dual-mono broadcasting (audio source) is "main (L channel)", "sub (R channel)", or "main (L channel)+sub (R channel)" is kept.

The control unit 60 can read a video-audio file from a memory card in a card holder 72 through a card interface (I/F) 71, and can write a video-audio file in the memory card.

The control unit 60 is connected to a given number of interface groups, such as a communication interface (I/F) 73, first and second HDMI interfaces (I/F) 74 and 75, a USB interface (I/F) 76 and an i.Link interface (I/F) 77, and serves as an controller for an external device, a hub (expansion device), or a network control device, which are connected to each interface. For example, the communication I/F 73 is connected to a LAN terminal 81, and is connected to an external NAS (Network Attached Storage) LAN-compatible HDD (Hard Disk Drive) (not shown). The LAN terminal 81 may be used as a general LAN port using Ethernet™. For example, the LAN terminal 81 connected to a hub may be connected to devices such as a LAN-compatible HDD, a PC (personal computer) and a HDD built-in DVD recorder.

The first and second HDMI I/Fs 74 and 75 are connected to HDMI terminals 82 and 83, respectively, and are connected to, for example, a DVD recorder, an AV amp, or a hub, which are not shown. The AV amp is connected to, for example, a DVD recorder, a DVD player, or the like. The hub may be connected to external devices such as an AV amp having an HDMI terminal, a PC (personal computer), a HDD built-in DVD recorder and a DVD player.

The HDMI terminals 82 and 83 are connectable to a network such as internet through a broadband router, to read, reproduce and write movie files (video data) or audio files (audio data) with respect to a PC on network, a mobile phone, or a mobile terminal, through the hub.

The USB I/F 76 connected to a USB port 84 is connectable to a mobile phone, a digital camera, a card reader/writer for a memory card, a USB HDD, a keyboard and the like through a hub (not shown) connected to the port 84, and can transmit and receive information to and from the USB devices.

Although not shown, the i.Link I/F 77 is connectable to, for example, external devices such as AV (audio-visual)—HDD or D (digital)—VHS (video home system), or an external terrestrial digital tuner and the like in series, and can transmit and receive information to and from any connected device.

Although not described, for example, a network controller based on a DLNA (Digital Living Network Alliance™) standard or the like, or a Bluetooth™ is provided in addition to individual interfaces or instead of any one or more interfaces. Through them, a recorder device, a HDD device, or a mobile terminal device capable of transmitting and receiving data may be connected.

Hereinafter, a main signal processing system of the TV receiver 11 will be described.

A satellite digital television broadcasting signal received by a BS/CS digital broadcasting antenna 42 is input to a satellite digital broadcasting tuner 44 through an input terminal 43.

The tuner 44 selects a broadcasting signal of a desired channel by the control signal of the control unit 60, and outputs the selected broadcasting signal to a PSK (Phase Shift Keying) demodulator 45.

The PSK demodulator 45 demodulates the broadcasting signal selected by the tuner 44 based on the control signal of the control unit 60, obtains transport stream (TS) including a desired program, and outputs the TS to a TS decoder 46.

The TS decoder 46 performs a TS decoding process of a transport stream multiplex signal by the control signal of the control unit 60, and outputs digital video signal and audio signal of a desired program to a signal processing unit 47. The TS decoder 46 outputs various data (service information) for acquiring programs (contents) sent by digital broadcasting, electronic program guide (EPG) information, program attribute information (program genre, etc.), caption information and the like to the control unit 60.

The terrestrial digital television broadcasting signal received by the terrestrial broadcasting antenna 48 is input to a terrestrial digital broadcasting tuner 50 through an input terminal 49.

The tuner 50 selects a broadcasting signal of a desired channel by the control signal of the control unit 60, and outputs the selected broadcasting signal to an OFDM (Orthogonal Frequency Division Multiplexing) demodulator 51.

The OFDM demodulator 51 demodulates the broadcasting signal selected by the tuner 50 based on the control signal of the control unit 60, obtains transport stream including a desired program, and outputs the TS to a TS decoder 56.

The TS decoder 56 performs a TS decoding process of the transport stream (TS) multiplex signal under the control of the control unit 60, and outputs digital video signal and audio signal of a desired program to the signal processing unit 47. The TS decoder 56 acquires various data for acquiring programs sent by digital broadcasting, electronic program guide (EPG) information, or program attribute information (program genre, etc.) and the like, and outputs them to the control unit 60.

The terrestrial analog television broadcasting signal received by the terrestrial broadcasting antenna 48 is input to a terrestrial analog broadcasting tuner 52 through the input terminal 49, thereby selecting a broadcasting signal of a desired channel. The broadcasting signal selected by the tuner 52 is demodulated into analog contents, that is, analog video signal and audio signal by an analog demodulator 53, and then is output to the signal processing unit 47.

The signal processing unit 47 selectively performs a given digital signal process on the digital video signal and audio signal input from the PSK demodulator 45 and the OFDM demodulator 51, and outputs the signals to a graphic processing unit 54 and an audio processing unit 55.

The signal processing unit 47 is connected to a plurality (four in the figure) of input terminals 40*a*, 40*b*, 40*c* and 40*d*. Analog video signal and audio signal can be input from the outside through the input terminals 40*a* to 40*d* to the TV receiver 11.

The signal processing unit 47 selectively digitalizes the analog video signal and audio signal input from the analog demodulator 53 and the input terminals 40*a* to 40*d*, performs a given digital signal process on the digitalized video signal and audio signal, and then outputs the signals to the graphic processing unit 54 and the audio processing unit 55.

The graphic processing unit 54 has a function of overlapping an OSD signal generated in an OS (On Screen Display) signal generating unit 57 with the digital video signal input from the signal processing unit 47. The graphic processing unit 54 can selectively output the output video signal of the signal processing unit 47 and the output OSD signal of the OS signal generating unit 57, and can combine both outputs to respectively configure a half region of a screen.

The output OSD signal output by the OS signal generating unit 57 may be output by overlapping in a "semi-transparent" state (a part of the general video signal can be transmitted), on the general video display, by setting a $\alpha$ blending parameter.

When a broadcasting signal accompanies caption signal and a caption can be displayed, the graphic processing unit 54 performs a process of overlapping caption information with a video signal based on the caption information and the control signal of the control unit 60.

The digital video signal output from the graphic processing unit 54 is input to a video processing unit 58. The video processing unit 58 converts the digital video signal input from the graphic processing unit 54 into an analog video signal, so that the video signal can be reproduced as a video (movie/still image) output by a video display 13 (display device/monitor device). An output terminal 21 connected to the video processing unit 58 may be connected to an external device, such as an expansion projecting device (projector device) and an external monitor device. The output terminal 21 may be connected to a DVD recorder device using a DVD-standard optical disk as a recording medium or a video recorder device using a video tape as a recording medium.

The audio processing unit 55 converts the digital audio signal input from the signal processing unit 47 into an analog audio signal, and outputs the analog audio signal to an audio reproducer 15, such as a speaker and the like. Although not described, the audio signal (audio output) may be output to an external speaker connected to the output terminal 23, an audio amp (mixer amp), or a headphone output terminal that is provided as one type of the output terminal 23, to be reproduced as sound/audio output.

When the external device connected through the HDMI I/Fs 74 and 75, that is, HDMI terminals 82 and 83 is based on HDMI-CEC (Consumer Electronics Control), the connected external device can be controlled through the TV receiver by manipulating a remote terminal (remote controller) thereof.

For example, movies (video signal) and audios (audio signal) is supplied from a broadcaster through a space wave to be received by the antennas 42 and 48, from a distributor through a network such as an optical fiber, or from a seller through a recording medium such as an optical disk, and a technique (hereinafter, referred to "surround"), such as a surround-effect technique and the like, is used for improving an acoustic sensitivity.

By applying the sound-field effect such as the surround, a sound-field sensitivity in stereo broadcasting (stereo audio signal) or multi-channel broadcasting (audio source) is improved. When both of "main-audio" and "sub-audio" or the two languages are reproduced in audio multiplex broadcasting such as dual-mono broadcasting (audio source) and two-language broadcasting (bilingual), the audios are mixed with one another. In this case, it is difficult to normally reproduce the audio signals. From such a background, a technique for invalidating the surround when dual-mono broadcasting (audio source) is detected has been embodied already.

However, when it is simply set to "main audio (L channel)" or "sub audio (R channel)" based on the user's setting with respect to dual-mono broadcasting (audio source) and the surround is simply invalidated, there is a fear that the surround can not be obtained for a state (broadcasting or audio source) where the surround effect is desired to be applied. There is a case where the surround is set in connection with the setting of an equalizer or the like, and a sound effect, such as a cinema mode and the like prepared for movies supplied as dual-mono broadcasting (audio source), may also be invalidated in such case.

Figure 2:
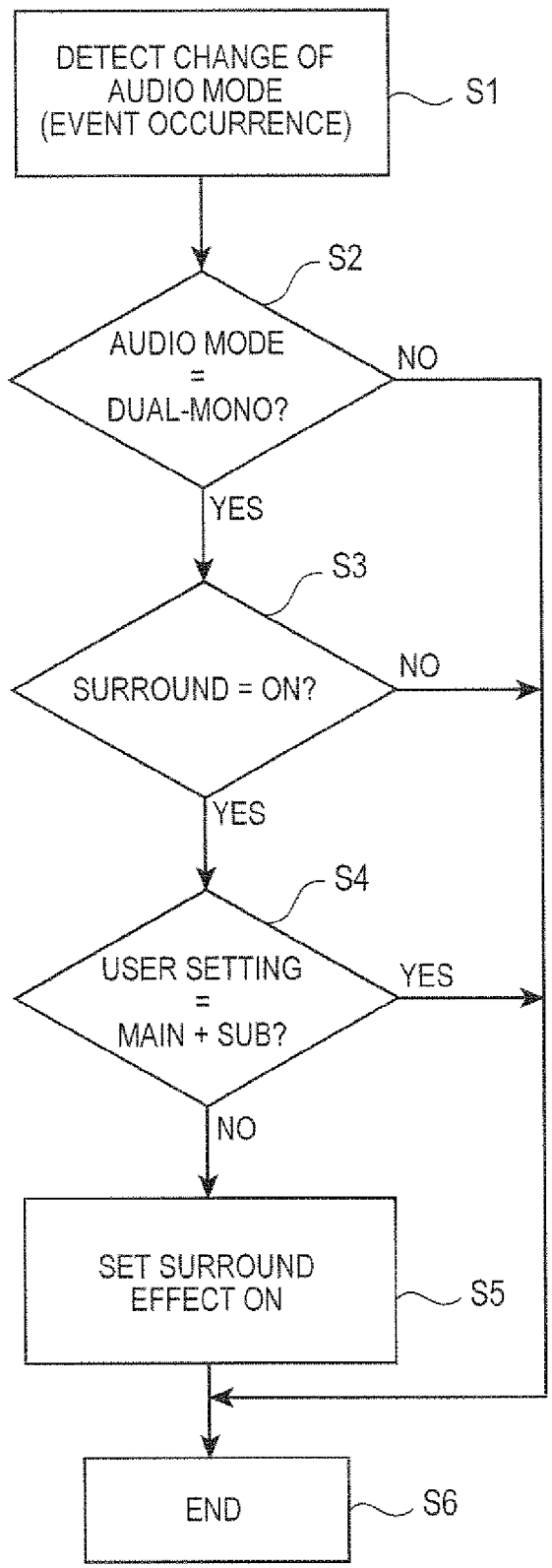
FIG. 2 illustrates an exemplary method for automatically setting application and non-application of a sound-field effect in the video-audio reproducing apparatus shown in FIG. 1, in a software manner.

As shown in FIG. 2, in the present invention, when the dual-mono broadcasting (audio source) is detected by the operation of the control unit 60, a reproducing mode preset by a user is extracted (read out) and the surround is invalidated for the case where the user setting does not need the surround (sound-field effect). Therefore, the effect such as the surround for the dual-mono broadcasting (audio source) is effectively exhibited.

As shown in FIG. 2, a change of an audio mode of contents including an input video (movie file) and audio (audio file) is detected (S1) as an event.

When it is detected that the audio mode is dual-mono, that is, audio multiplex broadcasting or two-language broadcasting (bilingual) (S2-YES), it is detected whether, in the present audio reproducing mode, the surround effect is set ON (application) or OFF (non-application) (S3).

When the surround effect is set ON (applied) (S3-YES), it is determined whether or not the user reproducing setting for the dual-mono broadcasting (audio source) is "main audio (L channel)+sub audio (R channel)" (S4).

When the user reproducing setting for the dual-mono broadcasting (audio source) is different from "main audio (L channel)+sub audio (R channel)" (S4-NO), the surround effect is set ON even when the dual-mono broadcasting (audio source) is provided (S5).

In the present audio reproducing mode, when the surround effect is set ON (applied) (S3-YES), the user reproducing setting for the dual-mono broadcasting (audio source) is "main (L channel)+sub (R channel)" (S4-YES), the surround effect is set OFF (not applied) and the surround setting mode ends (S6).

That is, the surround effect is set OFF only when it is determined that the application of the surround effect (surround effect ON) is clearly inappropriate based on the user setting of the audio reproducing mode and the audio mode of the supplied audio data. Accordingly, it is possible to appropriately provide the surround effect provided as the sound effect such as a cinema mode prepared for movies when the audio data is reproduced by the main audio (L channel) or the sub audio (R channel).

For example, the user is enabled to set whether or not "the surround effect is applied only to the present input event" (when the "main (L channel)+sub (R channel)" mode is selected, the normal surround effect is invalidated or not) in the setting screen through a remote controller. Accordingly, it is possible to more easily reflect user's taste.

It is possible to easily recognize whether or not the provided audio mode is dual-mono, that is, audio multiplex broadcasting or two-language broadcasting, for example, with reference to an audio mode descriptor in audio stream in the case of digital broadcasting, and a channel configuration descriptor in the case of an audio based on a compression manner of an MPEC (Moving Picture Experts Group)-2 standard. That is, it is easily acquired the audio mode in the signal processing unit 47 (see FIG. 1) when a compressed signal based on the MPEG-2 standard is decoded in the case of digital broadcasting. In addition, it is possible to recognize the audio mode using event information previously sent (can be previously acquired) to be used for an electronic program guide (EPS) or the like. For analog broadcasting, it is possible to use an audio mode determination signal included in the analog audio signal. Similarly with the digital broadcasting, it is possible to use event information previously sent to be used for the electronic program guide (EPG) or the like.

As the surround effect, changing of a phase, an intermixing ratio and the like between left and right channels or a multi-channel may be performed. For example, as the case where the setting of ON (effective) and OFF (ineffective) of the surround effect, frequency characteristic change (equalizer setting), dynamic range control (Dolby DRC, Dolby volume), BBE (Dynamic Range Control System provided by BEE Inc.) and the like are used in combination. By invalidating only the surround effect for the setting of "main (L channel)+sub (R channel)", and by independently controlling each technique (effect), a more optimal effect can be obtained. The phase, the intermixing ratio and the like for the left and right channels or multi-channel are set by an audio processing unit 55, a phase control unit 65 provided integrally with the control unit 60 or in the control unit 60, or a mixing ratio changing unit 66.

There is a case that, when the contents are encoded in IP broadcasting or a PC (personal computer), the audio mode of the contents is treated as audio multiplex broadcasting, although it is a stereo mode. In such, when the ineffectiveness (OFF) and effectiveness (ON) of the surround are controlled using only the audio mode, a desired effect (effect intended by a contents supply source) may not be obtained for the setting of "main (L channel)+sub (R channel)". In the embodiment, such a problem can be solved by additionally using the user setting as a determination reference.

Figure 3:
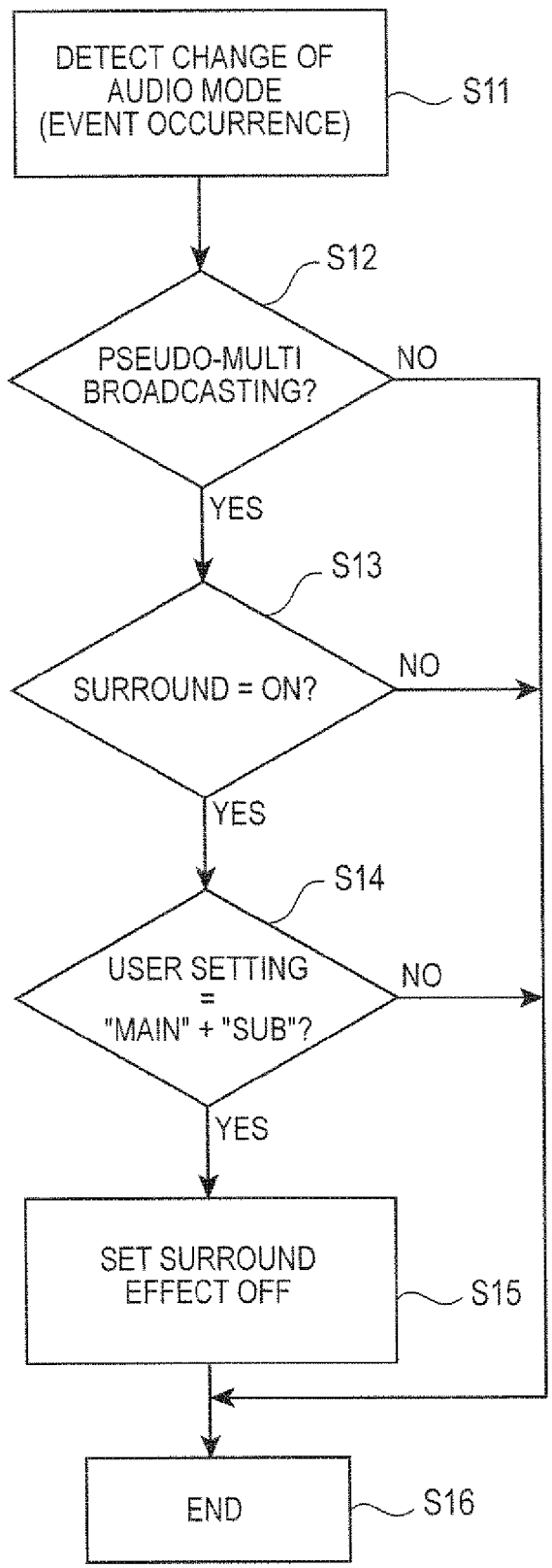
FIG. 3 illustrates another exemplary method for automatically setting application and non-application of a sound-field effect in the video-audio reproducing apparatus shown in FIG. 1, in a software manner.

A schematic diagram thereof is shown in FIG. 3. First, occurrence of an event that is change of an audio mode in the content such as an input video (movie file) and audio (audio file) is detected (S11).

When it is detected that the audio mode is non-audio multiplex broadcasting or pseudo multiplex broadcasting, or that a "main" audio and a "sub" audio are not separated in the signal (S12-YES), it is detected whether a surround effect is set ON (effective) or OFF (ineffective) (S13) in the present audio reproducing mode.

When it is detected that the audio mode is non-audio multiplex broadcasting or pseudo multiplex broadcasting in which a "main" audio and a "sub" audio are not separated (S12-YES), it is detected whether a surround effect is set ON (effective) or OFF (ineffective) (S13) in the present audio reproducing mode.

When the surround effect is set ON (effective) (S13-YES), it is determined whether or not the user setting for dual-mono broadcasting (audio source) is "main audio (L channel)+sub audio (R channel)" (S14).

When the user setting at the time of the dual-mono broadcasting (audio source) is "main audio (L channel)+sub audio (R channel)" (S14-YES), the surround effect is set OFF in the audio reproduction of the provided pseudo multiplex broadcasting (S15).

Then, in the present audio reproducing mode, when the surround effect is ON (effective) (S13-YES) and the user setting at the time of reproducing the dual-mono broadcasting (audio source) is different from "main (L channel)+sub (R channel)" (S14-NO), the surround effect is set ON (effective) and the surround setting mode ends (S16).

When an audio is output from the TV receiver to an AV amp that is an external device, using an optical cable (PCM), a pin cable, an audio transmitting means in an HDMI, or the like, the setting ("main (L channel)+sub (R channel)", "main (L channel)", or "sub R channel)") of a dual mode set on the TV receiver side can be sent to the AV amp (external device). That is, even when independently reproducing an audio using the external device (AV amp), the same effect (appropriate control of the surround effect) can be expected.

As described above, when reproducing various audio data including broadcasting based on an internet protocol or dual-mono audio, it is possible to optimally set the sound-field effect such as the surround.

Accordingly, the sound-field effect is represented appropriately.

In addition, it is possible to obtain a sound-field effect intended by a contents supply source.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A video-audio reproducing apparatus comprising:
    an audio processing unit configured to apply a sound field effect to an audio of a content; the audio having an audio mode;
    an audio mode detecting unit configured to detect the audio mode of the audio;
    a switching unit configured to turn off the sound field effect applied by the audio processing unit in response to a detection that the audio mode of the audio is a dual-mono broadcasting including a main audio and a sub audio; and
    an announcing unit configured to announce, when the audio is output to a reproducing unit configured to reproduce, a fact that the sound field effect applied by the audio signal processing unit is turned off, through an HDMI interface.

2. The video-audio reproducing apparatus according to claim 1,
    wherein the sound field effect includes a surround effect.

3. The video-audio reproducing apparatus of claim 1 further comprising:
    an input unit configured to receive a control signal input to turn on/off the sound field effect by the switching unit.

4. A video-audio reproducing apparatus comprising:
    an audio mode detecting unit configured to detect an audio mode in a content;
    a comparison unit configured to compare when the audio mode of the content detected by the audio mode detecting unit is multiplex broadcasting or a dual-mono broadcasting including a main audio and a sub audio, with a previously-designated audio reproducing mode;
    a switching unit configured to turn on/off a sound field effect to the audio mode of the content based on the comparison result by the comparison unit;
    a mixing ratio change unit configured to change a right-left phase or an intermixing ratio, independently of the sound field effect by the switching unit; and
    an announcing unit configured to announce, when the audio is output to a reproducing unit configured to reproduce, a fact that it is an audio mode to which the sound field effect is turned off switching unit, through an HDMI interface.

5. The video-audio reproducing apparatus according to claim 4,
    wherein the sound field effect includes a surround effect.

6. The video-audio reproducing apparatus according to claim 4, further comprising:
    an input unit configured to receive a control signal input to turn on/off the sound field effect by the switching unit.

7. The video-audio reproducing apparatus of claim 4, further comprising:
    an input unit configured to receive a control signal input to turn on/off the sound field effect by the switching unit.

8. A video-audio reproducing apparatus comprising:
    an audio mode detecting unit configured to detect an audio mode of a content;
    a comparison unit configured to compare, when the audio mode of the content detected by the audio mode detecting unit is a non-multiplex broadcasting or an audio signal provided as a pseudo multiplex broadcasting in which a main audio and a sub audio are not separated, with a previously-designated audio reproducing mode;
    a switching unit configured to turn on/off a sound field effect to the audio mode of the content based on a comparison result by the comparison unit; and an announcing unit configured to announce, when the audio is output to a reproducing unit configured to reproduce, a fact that it is an audio mode to which the sound field effect is turned off by the switching unit, through an HDMI interface.

9. The video-audio reproducing apparatus according to claim 8,
wherein the sound field effect includes a surround effect.

* * * * *